United States Patent [19]

Lucas, III

[11] Patent Number: 4,606,823
[45] Date of Patent: Aug. 19, 1986

[54] WATER FILTERING APPARATUS

[76] Inventor: Charles E. Lucas, III, P.O. Box 1641, Lufkin, Tex. 75901

[21] Appl. No.: 548,452

[22] Filed: Nov. 3, 1983

[51] Int. Cl.⁴ .......................................... B01D 23/14
[52] U.S. Cl. .................................... 210/282; 210/289; 210/291
[58] Field of Search .................... 210/282, 289, 416.3, 210/251, 290, 266, 291–293

[56] References Cited

U.S. PATENT DOCUMENTS

| 3,169,112 | 2/1965 | Nelson | 210/289 X |
| 3,595,399 | 7/1971 | Abos et al. | 210/282 X |
| 4,212,743 | 7/1980 | Van Meter et al. | 210/282 |
| 4,287,057 | 9/1981 | Stanley | 210/282 X |

Primary Examiner—Thomas Wyse
Attorney, Agent, or Firm—Neal J. Mosely

[57] ABSTRACT

Water filtering apparatus is disclosed comprising a water filtering unit attachable to faucets or water pipes and a valve assembly used in conjunction therewith. The filtering unit is provided at each end with fluid dispersion plates constructed so that fluid passes uniformly therethrough to prevent channeling of a central filtering and conditioning media of activated carbon granules. Fabric filter members are interposed between the dispersion plates and the carbon granules to remove suspended particulates from the fluid. The valve assembly may be interposed between the faucet and the filtering unit to reverse the fluid flow and backwash the filtering unit.

14 Claims, 7 Drawing Figures

WATER FILTERING APPARATUS

BACKGROUND OF THE INVENTION

Field of the Invention

This invention relates generally to water filters, and more particularly to water filtering apparatus comprising a water filtering unit attachable to faucets or water pipes and a valve assembly used in conjunction therewith.

BRIEF DESCRIPTION OF THE PRIOR ART

Water filtering apparatus and systems are well known in the art. One of the principal difficulties with prior water conditioning devices has been the tendency of granular filter materials to channel. When a liquid medium flows through a bed of material, the path of least resistance is gradually errorded to form a channel through the fixed bed, and substantial proportions of the medium will traverse such channels without necessarily undergoing the physical and/or chemcal conditioning which is desired.

There are several patents which disclose filtering units and valve means for the purification and conditioning of water.

Shindell, U.S. Pat. No. 3,342,340 discloses a small water conditioning apparatus having a readily replaceable conditioning cartridge. A hollow cylindrical cartridge is divided into two separate chambers containing a granular water conditioner by a resilient fibrous pad and the chambers are provided with similar pads at their extremities for interrupting and distributing the flow of water through the apparatus.

Stanley, U.S. Pat. No. 4,287,057 discloses a portable sink top water conditioner having couplings for periodically recharging the water filtering and conditioning elements in response to an indicator signal generated as a result of deposition of a predetermined weight of material filtered from the water and retained by the conditioner. Steel mesh screens segregate the filter media into a first filtering bed containing activated carbon and a second bed containing grain resin. Similar screens at the ends of the beds serve to control bacteria and support the beds.

Sampson et al, U.S. Pat. No. 3,184,064 discloses a water filter having a removable self contained frusto-conical plastic filter cage. The cage has a perforated end and a perforated plastic cap. Five juxtaposed coaxial circular filter members or layers extend from the cage apex to the cap. No provision is made for backwashing the device.

Keller et al, U.S. Pat. No. 2,773,601 discloses a method for constructing water filters and product thereof wherein loose filter material such as activated charcoal is positioned in a filter housing between porous layers of material containing bonding. The whole unit is heated to make the layers rigid and thereby retain the loose filtering medium in operative position under normal lower operating temperatures. A perforated disk is shown above the hardened layer in one embodiment of the invention. No provision is made for backwashing.

Moffitt, U.S. Pat. No. 592,525 discloses a filter provided with top and bottom perforated plates, and a five way valve. The valve permits the flow of water down through the central vessel containing sand, up through an internal cone containing charcoal, and down a central pipe. In the other valve position, the water passes in the other direction to backwash the filter.

Waldron, U.S. Pat. No. 1,976,906 discloses a water softener having a central tube whereby the flow of water is dispersed through the softening medium. The water softener is provided with a bonnet which is swingable to two different positions whereby the direction of water flow may be reversed.

Daniels, U.S. Pat. No. Re. 24,055 discloses a lift turn multiple port valve for use with water softeners.

Other multiple port valves of interest are; Brett, U.S. Pat. No. 3,809,247, and Pease, U.S. Pat. No. 4,105,555. Both patents disclose similar valves directed for use with swimming pool filters.

The prior art in general, and one of these patents in particular, disclose a water filtering apparatus attachable to faucets or water pipes and a valve assembly used in conjunction therewith, including means to prevent channeling of the filter material, and means whereby the filtering unit may be backwashed.

SUMMARY OF THE INVENTION

It is therefore an object of the present invention to provide a water filtering apparatus which is attractive in appearance and which is easily and quickly attached to faucets or water pipes for operational use on countertops or under counters.

Another object of this invention is to provide a water filtering apparatus having dispersion plates of novel construction to more efficiently disperse the flow of water and reduce channeling of the filter medium.

Another object of this invention is to provide a water filtering apparatus wherein fibrous filter septums are used to filter the water and retain the filter medium.

Another object of this invention is to provide water filtering apparatus comprising a valve member which may be interposed between the faucet and the filtering unit whereby the filtering unit may be backwashed.

Other objects of the invention will become apparent from time to time throughout the specification and claims as hereinafter related.

The above noted objects and other objects of the invention are accomplished by water filtering apparatus comprising a water filtering unit attachable to faucets or water pipes and a valve assembly used in conjunction therewith. The filtering unit is provided at each end with fluid dispersion plates of novel construction whereby fluid passes uniformly therethrough to prevent channeling of a central filtering and conditioning media of activated carbon granules. Fabric filter members are interposed between the dispersion plates and the carbon granules to remove suspended particulates from the fluid. The valve assembly may be interposed between the faucet and the filtering unit to reverse the fluid flow and backwash the filtering unit.

DESCRIPTION OF THE PREFERRED EMBODIMENT

Figure 1:
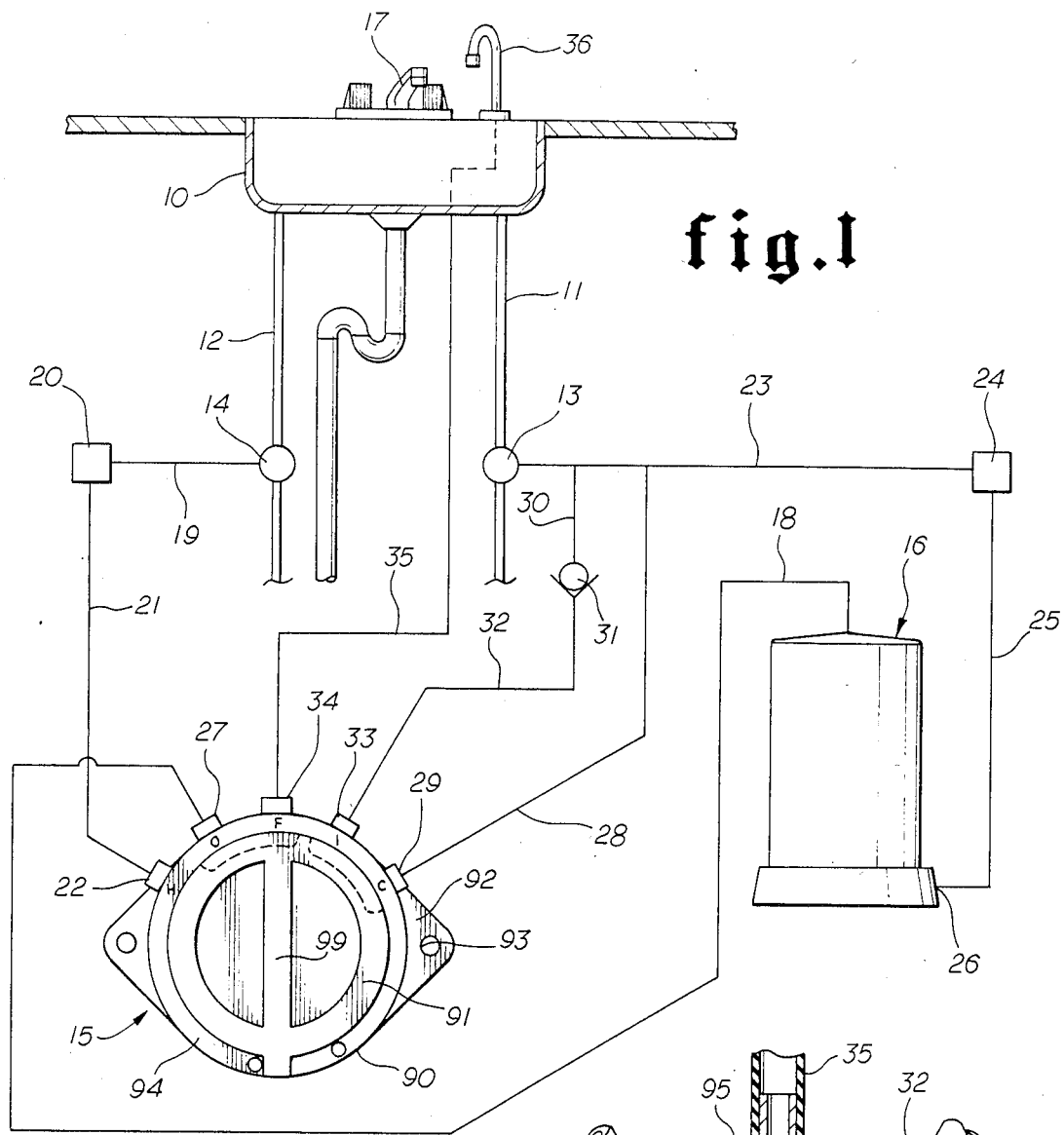
FIG. 1 is a schematic view of the water filtering unit and control valve attached to a water pipe under a sink counter.

Referring to the drawings by numerals of reference, and more particularly to FIG. 1, there is shown a conventional sink fixture 10 having a cold water supply pipe 11 and a hot water supply pipe 12. Conventional tee valves or saddle valves 13 and 14 are installed respectively in or on the cold water supply line 11 and hot water supply line 12 to control water flow to a selector valve 15 and water filtering unit 16.

For countertop installations, water filtering unit 16 is connected to a diverter valve (not shown) for directing water flow through the unit to the faucet 17. Various conventional faucet connections may be used to connect the unit to a conventional faucet 17. Common faucet connectors include a screw-on type some of which may include a diverter valve which threads onto the spout of the faucet. Another common type is a funnel shaped molded rubber fitting which merely slides over the spout.

Water entering the filtering unit 16 will be filtered and conditioned as hereinafter described and pass out the top of the unit through an outlet tube 18. It may be desirable to place the filtering unit 16 on the counter top for use, in which case an outlet tube of different suitable design would be incorporated. As shown, the outlet tube 17 could be connected to a faucet 18 especially for the treated water. Alternatively, the outlet tube 17 could be attached to the existing faucet 14, or tied back in to the cold water pipe 11 to use the existing faucet.

For undercounter installations, as in FIG. 1, the valve 14 on hot water line 12 is connected to line 19 to pressure reducing valve 20, which is, in turn, connected by line 21 to the hot water inlet 22 to selector valve 15. The valve 13 is connected by line 23 to pressure reducing valve 24 which is, in turn, connected by line 25 to inlet 26 on water filtering unit 16. Line 18 from the top of the filtering unit 16 is connected to outlet 27 from selector valve 15. Line 28 connects line 23 to cold water inlet 29 on selector valve 15. Line 30 connects line 23 to check valve 31 which is connected by line 32 to inlet 33 on selector valve 15. Faucet outlet 34 is connected by line 35 to faucet 36 on sink 10.

Referring now to FIGS. 3-7, the filtering unit 16 will be explained in detail. The filtering unit 16 comprises an elongated cylindrical cup-shaped housing 37 having a closed top 38 and open bottom end 39. The cylindrical housing 37 is preferably constructed of stainless steel for durability and to provide an attractive appearance. Peripheral indentations 40 are formed in the sidewall of the housing 37 and spaced inwardly from each of the ends 38 and 39.

A dished bottom end cap 41 closes the open bottom end 39 of the housing 37. A flat circular perforated dispersion plate 42 is positioned at the bottom end 39 of housing 37 and has a peripheral flange 43. A fabric material covers plate 42 and extend over the edge portion thereof. Plate 42 and fabric 43 are frictionally retained within the open end 39 of the housing 37 by the bottom cap member 41. Plate 42 has a plurality of perforations 45 extending radially outwardly from the center of the plate and a plurality of larger perforations 46 near the periphery of the plate. The combination of small perforations 45 and large perforations 46 serve to disperse the water flow through the plates more uniformly and prevent channeling of the filtering material.

Generally circular fiber filters 47 and 48 are positioned on top of the fabric layer 44. Water conditioning and filtering material 49 is positioned within the housing member 37. Although any conventional water conditioning material or materials may be incorporated without departing from the scope of the present invention, the preferred material used is activated carbon granules. The filtering unit 16 is designed to contain 3 pounds of granules which provides 400 acres of cleaning surface area. The activated carbon granules have the capacity to remove odor and taste from the water by removing or reducing many organic chemicals, pesticides, PCB's, THM's, sediment rust, slime, and bloodworms (found in 85 percent of the water). The activated carbon granules 49 function both as a filter and as an absorbent and adsorbent material.

Fiber filters 47 and 48 provide a fibrous septum supporting the loose granular particles 49 and assist in preventing channeling of the material. Fiber filters 47 and 48 are preferably composed of Dacron, however other materials may be used singularly or in combination such as Fiberglas, cellulose, felt, or linen. The filters 47 and 48 are positioned with their peripheral edges adjacent to the lower peripheral indentations 40 of the housing 37 which aids in holding them in place.

Generally circular fiber filters 50 and 51 are positioned on top of the layer of granular particles 49 to assist in securing the same in place. Fiber filters 50 and 51 provide a fibrous septum above the loose granular particles 49 and assist in preventing channeling of the material. Fiber filters 50 and 51 are preferably composed of Dacron, however other materials may be used singularly or in combination such as Fiberglas, cellulose, felt, or linen. The filters 50 and 51 are positioned with their peripheral edges adjacent to the upper peripheral indentations 40 of the housing 37 which aids in holding them in place.

A layer of fabric material 52 covers the top layer of filter fabric 51 to prevent any loose particles which may have passed through the fabric filters 50 and 51 from passing out of the filtering unit. An upper circular perforated dispersion plate 53 is positioned at the top end 38 of the housing 37. The dispersion plate 53 is provided with a peripheral flange 54 which is frictionally retained within the sidewall of the housing 37. The plate 53 has a plurality of perforations 55 and 56 around the outer peripheral portion thereof. There are more of the outer perforations 55 than the perforations 56 which permits more fluid flow to the outside and assists in preventing channeling of the granular filtering material 49.

A cylindrical cup shaped water dispersion member 57 is provided centrally within the concave portion of the top end wall 38. A series of circumferentially spaced holes 58 are provided on the periphery of the dispersion member 57. The end wall 59 of member 57 has a central opening 60. The end wall 38 of housing 37 has a thickened central portion with a threaded central opening 61 in which there is threadedly secured a fitting 62. The fitting 62 has a flange 63 abutting the end wall 38 and a threaded portion 64 with a conical end 65. Fitting 62 is operable to receive the flared end 66 of line 18 and is held in place by compression nut 67 acting through flanged sleeve 68.

At the bottom of the filtering unit 16, the bottom end cap 41 has a central opening 69 which receives the threaded end 70 of elbow 71. A washer 72 is positioned between shoulder 73 on elbow 71 and end plate 41. A nut 74 on the threaded end 70 of elbow 71 secures the same in place and compresses a sealing O-ring 75. The lower threaded end 76 of elbow 71 receives the end of line 25 and is secured thereon by fitting 77.

Filtering unit 16 is supported on a base member 78 preferably composed of a suitable plastic material. Base member 78 has a circular bottom portion 79 which is larger in diameter than the outside diameter of the housing 37 and a conical sidewall 80 which extends upwardly and terminates in a horizontal inwardly extended flange portion 81 surrounding the outside diameter of the lower end 39 of the housing 37.

A triangular reinforcement 82 is provided inside the base member 78 to strengthen the same to support the weight of the filtering unit 16. Reinforcement 82 comprises three flat longitudinal members 83, 84 and 85 having their ends joined to form three apexes which extend vertically upward along the sidewall 80. The top surface of the reinforcement 82 is contoured to fit the bottom end 39 of housing 37. Longitudinal member 84 is provided with an opening 86 for passage of the line 25 which enters through opening 89 in sidewall 80. The bottom portion of the base member 78 is closed by a flat circular steel base plate 87 provided with a series a depending rubber cushions 88. The cushions provide a non-skid footing for the base 78. The base plate 87 is attached to the bottom portion of the base member 55 by a frictional fit into internal supporting beads in the base member.

Figure 2:
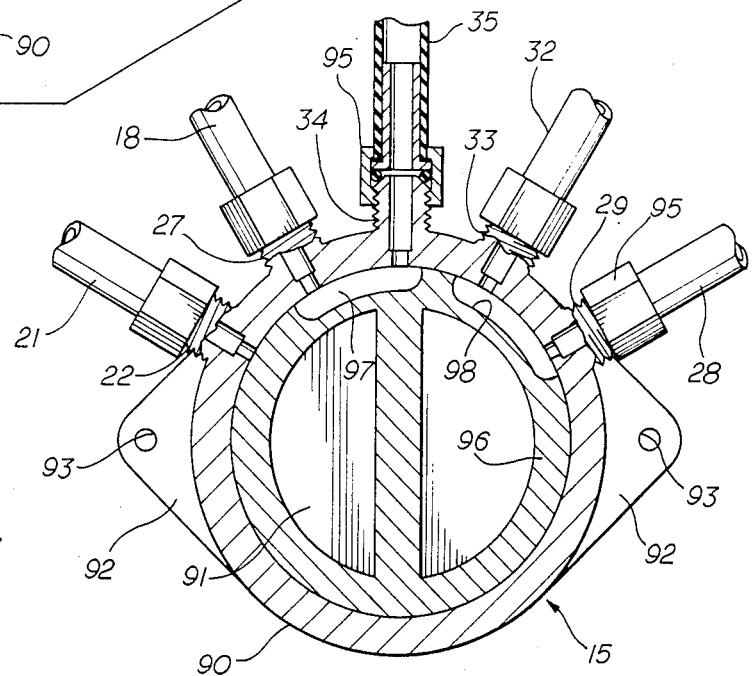
FIG. 2 is a sectional view of the control valve for the filtering unit.
Figure 3:
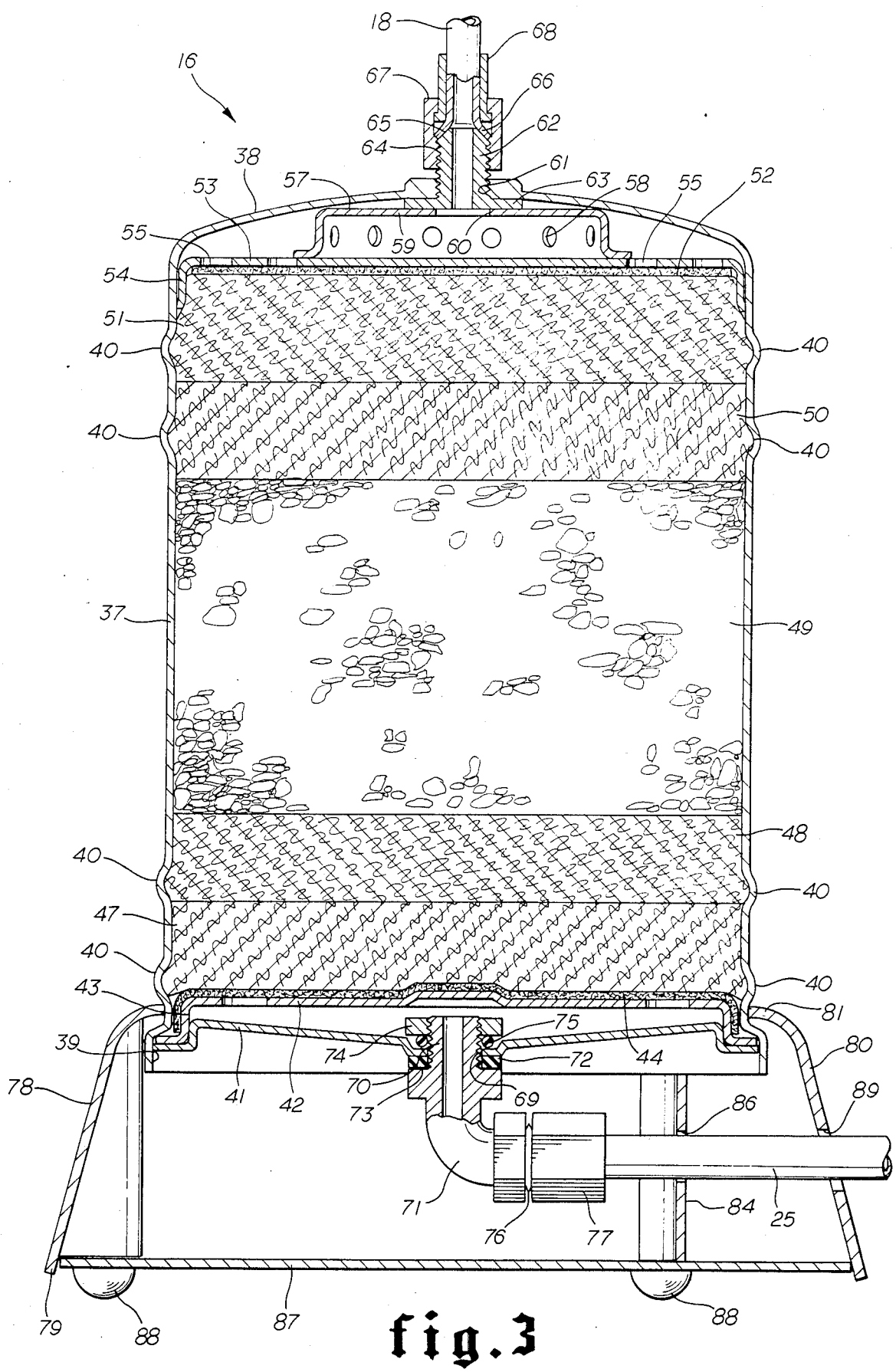
FIG. 3 is a view in vertical cross section of the water filtering unit constructed in accordance with the invention.
Figure 4:
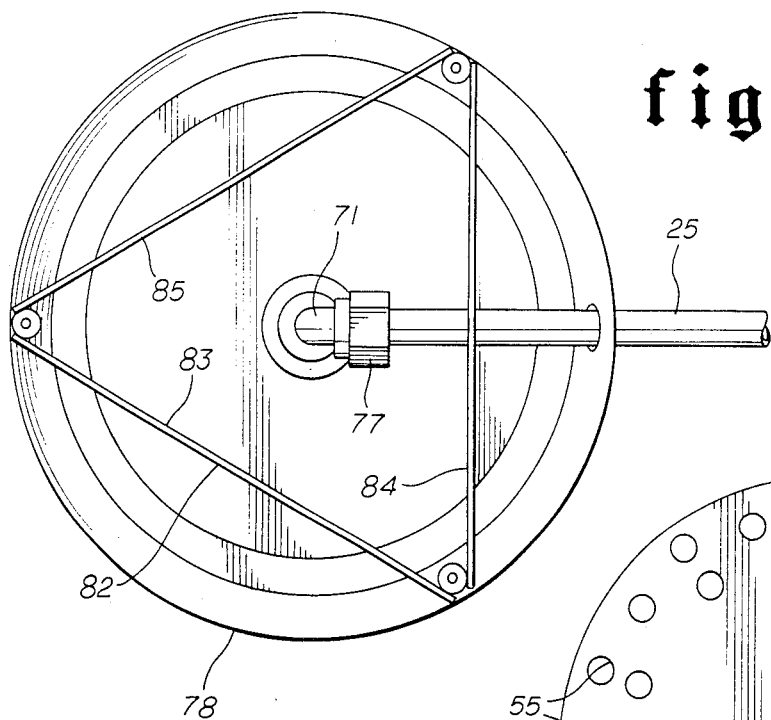
FIG. 4 is a plan view of the bottom of the filtering unit.
Figure 5:
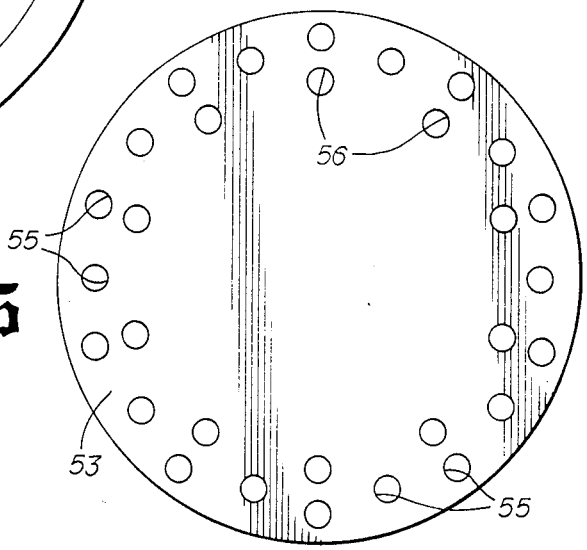
FIG. 5 is a plan view of the top distribution plate of the filtering unit.
Figure 6:
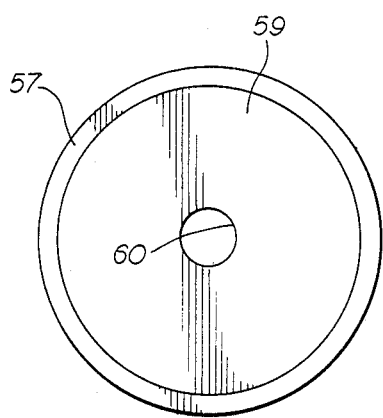
FIG. 6 is a top plan view of the top spacer unit of the filtering unit.
Figure 7:
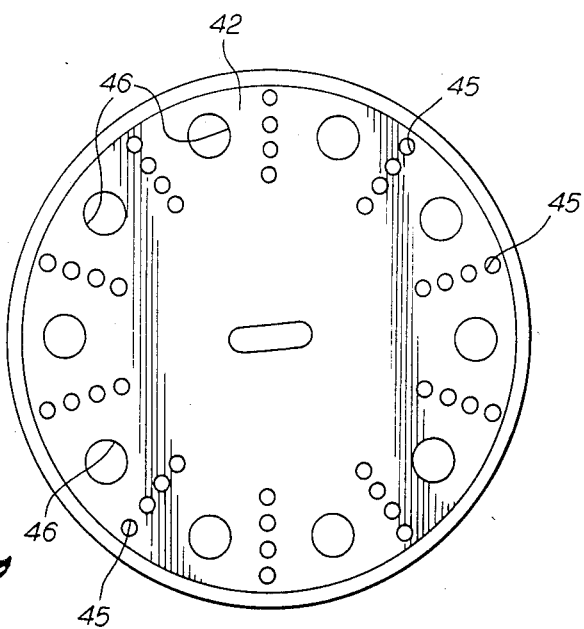
FIG. 7 is a plan view of the bottom distribution plate of the filtering unit.

FIG. 2 shows the selector valve 15 which is used in conjunction with the filtering unit 16 for a backwashing operation. The operation will be later described in detail, but a description of the valve assembly is presented here for an understanding of its arrangement and connection with the filtering unit 16.

The valve 15 comprises a cylindrical housing 90, a selector dial 91, and a base plate 92 having mounting holes 93. A cover 94 is secured over the housing 90. A series of externally threaded ports 22, 27, 34, 33, and 29, circumferentially spaced on the periphery of the housing 90 receive conventional hose fittings 95 for lines 21, 18, 35, 32 and 28, respectively. A cylindrical rotary member 96 is sealably and rotationally positioned within the housing 90.

Two circumferential slots 97 and 98 are provided on the peripheral of the rotary member 96. Slots 97 and 98 are circumferentially spaced apart and in axial alignment with the ports 22, 27, 34, 33 and 29 whereby rotary movement of the rotary member 96 will allow certain holes to communicate and will close off certain other holes. A center boss 99 on the rotary member 96 allows the user to select the operational mode of the valve assembly.

Hot water inlet line 21 from the hot water source is connected to the port 22 and line 28 connects the port 29 to lines 23 and 25 leading to the bottom of the filtering unit 16. Cold water inlet line 33 from the cold water supply is connected to the port 29. Line 18 is connected at one end to the port 27 and its other end will be connected to the fitting at the top of the filtering unit during the backwash operation. Line 35 is connected at one end to the port 34 and its other end discharges through the faucet 36.

OPERATION

In operation, water flows into the filtering unit 16 through line 15 which may be connected directly to the faucet or to the faucet diverter valve for countertop operation. In countertop operation, the water flow is initiated by operation of the hot and cold water valves and the diverter valve, if any, on the faucet. In this mode of operation, the line 25 may be a flexible plastic or rubber hose or a pipe or conduit with a suitable end fitting for connection to the faucet. The water enters through the bottom inlet 26 of the filtering unit 16 and flows through the fabric filters and the activated carbon granules to remove particulate matter and dissolved gases and other materials contributing to off-taste and odor.

In undercounter operation, the water filtering unit 16 is positioned below the counter and connected as shown in FIG. 1. The water filtering unit 16 operates as previously described, but is connected through the selector valve 15 which provides for a backwash for periodic cleaning. The water flowing through line 25 enters the filtering unit 16 at inlet 26 and fills the bottom reservoir cover 41. Line water pressure forces the water through the lower perforated dispersion plate 42 which distributes the water flow toward the outer part of the plate, through the larger diameter perforations 46. In this manner, the flow path of the water is dispersed more uniformly through the filter bed.

The water flows through the fiber filters 47 and 48 where it is treated and further diffused. The wate, after being effectively diffused and treated, then enters the lower portion of the activated carbon granular material 49 wherein where particulate material is filtered out and dissolved gases and other contaminants are absorbed or adsorbed. When the filtered water reaches the top portion of the activated carbon material 49, it passes through the upper fiber filters 50 and 51 where it is further filtered and the pressure again forces the treated water through the upper perforated dispersion plate 53 through the larger perforations 55 and 56 and then through the apertures 58 in the cup shaped dispersion member 57 and through the outlet fitting 62.

It can be understood from the foregoing that the flow path through the unit is evenly distributed and prevents a direct line of flow from the inlet fitting 26 to the outlet fitting 62 which would create a channel through the bed and reduce filtering efficiency.

In the arrangement shown in FIG. 1, the selector valve is set to direct cold water from line 11 through check valve 31 and line 32 to valve cavity 98. The water exits from cavity 98 through lines 28 and 23 and pressure reducing valve 24 to line 25 to the inlet 26 of filtering unit 16. The pressure reducing valves 20 and 24 reduce the line pressure of about 100 p.s.i. to a pressure of about 15 p.s.i. for flow through the filtering unit 16. The water then passes through the filtering unit 16 and out through line 18 to inlet 27 to cavity 97 in selector valve 15. The filtered water passes from cavity 97 through outlet 34 and line 35 to the faucet 36.

It is recommended to backwash the filtering unit 16 with hot water (145° F. or more) for twenty minutes every seven days, or for thirty minutes if the unit has been inactive for ten days or longer. The backwash operation will cleanse and pasteurize the unit. Referring now to FIGS. 1 and 2, for the countertop model, the filter inlet line 25 is disconnected from the faucet and placed in the sink. The outlet line 18 is connected to the same place on the faucet. The hot water faucet is turned on and the water travels backwards through the unit to flush out accumulated contaminants.

In the undercounter version, the selector valve 15 is used to initiate the backwash cycle. The selector valve 15 is connected and in the position described above. The valve disc 96 is turned to the left to the backwash mode. In this position, cavity 97 bridges outlets (or inlets) 22 and 27, and cavity 98 bridges outlets (or inlets) 33 and 34. This connects hot water line 12, through inlet 22, cavity 97 and outlet 27, to line 18 leading to the top of filtering unit 16. Hot water enters the top of the unit 16 and flows downward therethrough and exits from the bottom (inlet) opening 26 from which the backwash water is discharged into the sink. The backwash water leaves the filtering unit 16 into lines 25, 23, 30 and 32 leading to inlet 33 on selector valve 15. The water then passes through the cavity 98 and out through outlet 34 and line 35 where it is discharged through the faucet 36 into the sink 10.

After the backwashing operation, the selector valve is turned to the initial position shown in FIG. 1 and allowed to run for two minutes to flush out any remaining backwash water. It is also recommended to let water run through the unit for two minutes before each use to flush out any stale water and assure getting clean fresh water.

While this invention has been described fully and completely with special emphasis upon a preferred embodiment, it should be understood that within the scope of the appended claims the invention may be practiced otherwise than as specifically described herein.

I claim:

1. Apparatus for filtering and conditioning drinking water, and reversible for backflushing, said apparatus comprising:
    a container including a central bottom inlet for receiving the water to be filtered and a central top outlet for discharging the filtered and conditioned water,
    a first water dispersion member positioned in the lower portion of said container having a central imperforate portion adjacent to said central bottom inlet and a plurality of holes positioned at different radial distances from the center, a larger number of said holes being positioned near the periphery of said member and a lesser number of said holes being positioned closer to the center to equalize the flow of fluid at different radial positions and prevent channeling of the filter material,
    at least one lower filtering and conditioning member positioned in the lower portion of said container and above said first water dispersion member for diffusing the flowing water and removing suspended particulates therefrom,
    a particulate filtering and conditioning media positioned in the central portion of said container above said lower filtering and conditioning member for filtering the flowing water and removing odor and taste therefrom,
    at least one upper filtering and conditioning member positioned in the upper portion of said container above said filtering and conditioning media for diffusing the flowing water and removing suspended particulates therefrom, and
    a second water dispersion member positioned in the upper portion of said container having a central imperforate portion below said central top outlet and a plurality of holes positioned at different radial distances from the center, a larger number of said holes being positioned near the periphery of said member and a lesser number of said holes being positioned closer to the center to equalize the flow of fluid at different radial positions and prevent channeling of the filter material.

2. The apparatus according to claim 1 further including
    a base adapted to be received on the bottom portion of said container and having support members for supporting said container independent of the source of the water.

3. The apparatus according to claim 1 further including
    a third water dispersion member positioned within said container adjacent to said top central outlet and abutting said second dispersion member,
    said third dispersion member having means for directing flow of water to said top central outlet.

4. The apparatus according to claim 1 wherein
    at least one of said water dispersion members comprises a circular perforated plate having a fabric covering on at least one surface for removing suspended particulates from the water.

5. The apparatus according to claim 1 wherein
    said larger number of holes in one dispersion member comprise a pluraltiy of holes of small diameter extending radially outwardly from the center of the member and said lesser member of holes comprise a plurality of larger diameter holes uniformly spaced near the periphery of the member.

6. The apparatus according to claim 1 wherein
    said container is constructed of stainless steel.

7. The apparatus according to claim 1 wherein
    said water dispersion members are constructed of stainless steel.

8. The apparatus according to claim 1 wherein
    said upper and lower filtering and conditioner members are composed of a non-woven fabric material.

9. The apparatus according to claim 8 wherein
    said non-woven fabric material is Dacron.

10. The apparatus according to claim 1 wherein
    said particulate filtering and conditioning media is activated carbon granules.

11. The apparatus according to claim 3 wherein
    said container is constructed of stainless steel, and
    said first and said second water dispersion members comprise circular perforated stainless steel plates.

12. The apparatus according to claim 11 wherein
    at least one of said perforated stainless steel plates has a fabric covering on at least one surface for removing suspended particulates from the water.

13. The apparatus according to claim 11 wherein
    said larger number of holes in one stainless steel plate comprise a plurality of holes of small diameter extending radially outwardly from the center of the plate and said lesser number of holes comprise a plurality of larger diameter holes uniformly spaced near the periphery of the plate.

14. A system for filtering and conditioning waters comprising, in combination
    a sink,
    hot and cold water valves and a faucet on said sink,
    hot and cold water lines connected to said hot and cold water valves,
    a selector valve, a water filtering apparatus comprising a container including an inlet for receiving the water to be filtered and an outlet for discharging the filtered and conditioned water, a first water dispersion member positioned in the lower portion of said container provided with means for allowing uniform passage of water therethrough, at least one lower filtering and conditioning member positioned in the lower portion of said container and above said first water dispersion member for diffusing and removing suspended particulates from the water, a filtering and conditioning media positioned in the central portion of said container above said lower filtering and conditioning member for removing odor and taste from the water, at least one upper filtering and conditioning member positioned in the upper portion of said container above said filtering and conditioning media for diffusing and removing suspended particulates from the water, a second water dispersion member positioned in the upper portion of said container provided with means for allowing uniform passage of water therethrough, a third water dispersion member positioned within said container and surrounding said outlet provided with means for allowing uniform passage of water therethrough, a base for supporting said container independent of the source of the water, said selector valve being connected to said hot and cold water lines, to said inlet and outlet of said container, and to said faucet, said selector valve having one position directing flow of water from said cold water line to the inlet of said container, through said filtering apparatus, and from said container outlet to said faucet, and said selector valve having another position directing flow of water from said hot water line to the outlet of said container, through said filtering apparatus in the reverse direction, and out of the bottom inlet to said faucet, for backflushing said filtering apparatus.

* * * * *